US012531723B2

(12) United States Patent
Bisheh Niasar et al.

(10) Patent No.: US 12,531,723 B2
(45) Date of Patent: Jan. 20, 2026

(54) ARCHITECTURE FOR NUMBER THEORETIC TRANSFORM AND INVERSE NUMBER THEORETIC TRANSFORM

(71) Applicant: Microsoft Technology Licensing, LLC, Redmond, WA (US)

(72) Inventors: Mojtaba Bisheh Niasar, Ithaca, NY (US); Bharat S. Pillilli, El Dorado Hills, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 91 days.

(21) Appl. No.: 18/428,468

(22) Filed: Jan. 31, 2024

(65) Prior Publication Data

US 2025/0247217 A1 Jul. 31, 2025

(51) Int. Cl.
*H04L 9/08* (2006.01)
(52) U.S. Cl.
CPC .................. *H04L 9/0852* (2013.01)
(58) Field of Classification Search
CPC ....................................................... H04L 9/0852
See application file for complete search history.

(56) References Cited

U.S. PATENT DOCUMENTS

| | | | | |
|---|---|---|---|---|
| 12,335,365 | B2* | 6/2025 | Hamburg | G06F 17/142 |
| 2020/0265167 | A1* | 8/2020 | Banerjee | H04L 9/0631 |
| 2022/0006611 | A1* | 1/2022 | Ghosh | H04L 9/002 |
| 2022/0006630 | A1* | 1/2022 | Ghosh | H04L 9/0869 |
| 2023/0318829 | A1* | 10/2023 | Sim | H04L 9/0852 |
| 2024/0411833 | A1* | 12/2024 | Bisheh Niasar | G06F 7/50 |
| 2024/0413995 | A1* | 12/2024 | Bisheh Niasar | H04L 9/32 |

* cited by examiner

*Primary Examiner* — Baotran N To
(74) *Attorney, Agent, or Firm* — Schwegman Lundberg & Woessner, P.A.

(57) ABSTRACT

Generally discussed herein are devices, systems, and methods for performing a number theoretic transform (NTT)/inverse NTT (INTT). A circuit for NTT/INTT can include a first butterfly operator circuit (BOC) that generates first and second output coefficients based on first and second polynomial coefficients and a twiddle factor, a second BOC that operates in parallel with the first BOC and generates third and fourth output coefficients based on third and fourth polynomial coefficients and the twiddle factor, a third BOC that operates in series with the first and second BOCs and generates fifth and sixth output coefficients based on the first and third output coefficients and a second twiddle factor, and a fourth BOC that operates in series with the first and second BOCs and in parallel with the third BOC and generates seventh and eighth output coefficients based on the second and fourth output coefficients and a third twiddle factor.

20 Claims, 5 Drawing Sheets

ARCHITECTURE FOR NUMBER THEORETIC TRANSFORM AND INVERSE NUMBER THEORETIC TRANSFORM

BACKGROUND

The advent of quantum computers poses a serious challenge to the security of the existing public-key cryptosystems, as they can be potentially broken based on Shor's algorithm. Lattice-based cryptosystems are among the most promising post-quantum cryptography (PQC) algorithms that are believed to be hard for both classical and quantum computers to break.

SUMMARY

A method, device, system, or a machine-readable medium for number theoretic transform (NTT) and inverse NTT (INTT) are provided. A circuit can include a first butterfly operator circuit configured to generate first and second output coefficients based on first and second coefficients of a polynomial and a twiddle factor. The circuit can further include a second butterfly operator circuit (i) situated to operate in parallel with the first butterfly operator circuit and (ii) configured to generate third and fourth output coefficients based on third and fourth coefficients of the polynomial and the twiddle factor. The circuit can further include a third butterfly operator circuit (i) situated to operate in series with the first butterfly operator circuit and the second butterfly operator circuit and (ii) configured to generate fifth and sixth output coefficients based on the first and third output coefficients and a second twiddle factor. The circuit can further include a fourth butterfly operator circuit (i) situated to operate in series with the first butterfly operator circuit and the second butterfly operator circuit and parallel with the third butterfly operator circuit and (ii) configured to generate seventh and eighth output coefficients based on the second and fourth output coefficients and a third twiddle factor.

The first, second, third, and fourth butterfly operator circuits can be configured as Cooley-Tukey (CT) butterfly operator circuits or Gentleman-Sande (GS) butterfly operator circuits. The circuit can further include first, second, third, and fourth shift registers situated to receive fifth, sixth, seventh, eighth output coefficients, respectively. The first shift register can be situated to receive the fifth output coefficient at each clock cycle. The second shift register can be situated to receive the sixth output coefficient at each clock cycle. The third shift register can be situated to receive the seventh output coefficient at each clock cycle. The fourth shift register can be situated to receive the eighth output coefficient at each clock cycle.

Each of the first, second, third, and fourth shift registers can have a different depth. the depth of the first, second, third, and fourth shift registers can be four, five, six, and seven, respectively.

The circuit can further include a first multiplexer configured to provide, based on a select control of the first multiplexer, contents of the first, second, third, and fourth shift registers in consecutive, respective clock cycles. The circuit can further include a second multiplexer. The first multiplexer can be configured to provide contents of the first, second, third, and fourth shift registers to the second multiplexer in the consecutive, respective clock cycles.

A device, machine-readable medium, system, or method can be configured to implement the functionality of the circuit.

DETAILED DESCRIPTION

Figure 2:
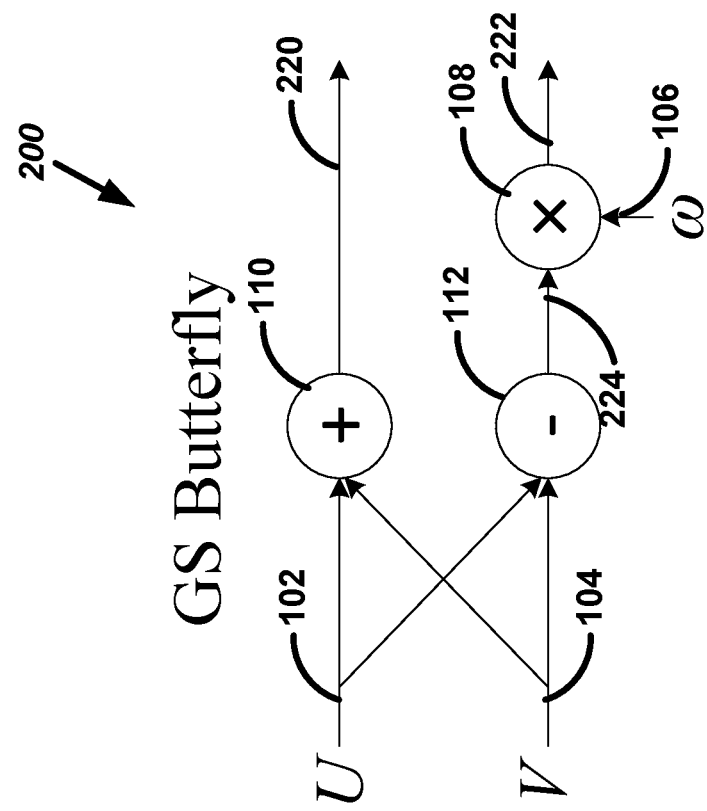
FIG. 2 illustrates, by way of example, a conceptual circuit diagram of an embodiment of a GS butterfly operator circuit.

In the following description, reference is made to the accompanying drawings that form a part hereof, and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

Cloud computing has become an integral part of modern society, offering various services and applications to individuals and organizations. The security of cloud computing is threatened by the advent of quantum computers, which can potentially break the existing public-key cryptosystems, such as Rivest-Shamir-Adleman (RSA) and Elliptic Curve Cryptography (ECC) based on Shor's algorithm. Shor's algorithm is a quantum computer algorithm for finding the prime factors of an integer. Current public-key cryptography is not presently threatened by modern quantum computers. However, cloud resource managers should anticipate the challenge quantum computers pose to modern cryptography and initiate a transition to a postquantum era in a timely manner. In fact, the U.S. government issued a National Security Memorandum in May 2022 that mandated federal agencies to migrate to post-quantum cryptosystems (PQC) by 2035 to mitigate risks to vulnerable cryptographic systems.

A long-term security of cloud computing against quantum attacks can benefit from developing lattice-based cryptosystems, which are among the most promising PQC algorithms that are believed to be hard for both classical and quantum computers. Lattice-based cryptosystems are among the most promising PQC algorithms that are believed to be hard for both classical and quantum computers. NTT and INTT can be used to achieve more efficient polynomial multiplication in lattice-based cryptosystems. NTT and INTT help reduce algorithm complexity from $O(n^2)$ to $O(n \log n)$. The complexity of the NTT and INTT computation can benefit from improvement in terms of efficiency so as to help improve operation of the lattice-based cryptosystems. Embodiments help reduce the complexity of the NTT and INTT computation. Embodiments can include a circuit architecture that can include multi-levels of parallelism. The parallelism helps accelerate the NTT/INTT computation on reconfigurable hardware. Embodiments allow a designer to explore different design spaces. Embodiments can allow a designer to explore trade-offs on hardware platforms for different NTT/INTT configurations. Embodiments can use one or more of various optimization techniques, including multi-levels of parallelism, designing reconfigurable cores, and implementing interleaved and pipelined architecture. Embodiments can achieve significant speedup as compared to prior NTT and INTT computation techniques. Embodiments can achieve the speedup while maintaining high security and scalability.

NTT and INTT operations can be accomplished iteratively. NTT and INTT can be performed by applying a sequence of "butterfly operations" on the input polynomial coefficients. Butterfly operations are arithmetic operations that combine two coefficients of polynomials to obtain two outputs. The NTT and INTT operations can be computed in a logarithmic number of steps using repeated butterfly operations.

Figure 1:
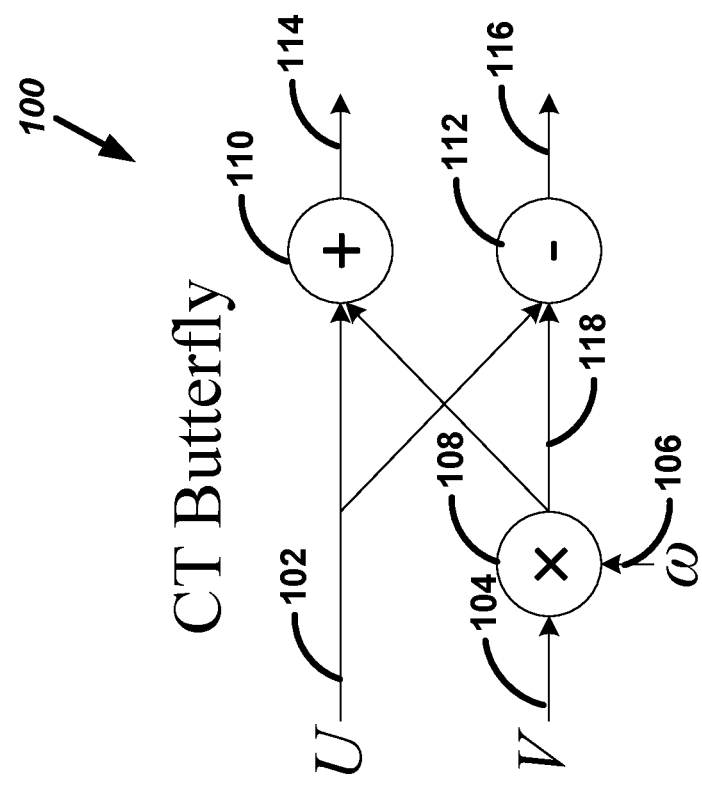
FIG. 1 illustrates, by way of example, a conceptual circuit diagram of an embodiment of a CT butterfly operator circuit.

In embodiments, Cooley-Tukey (CT) and Gentleman-Sande (GS) butterfly configurations can be used to facilitate NTT/INTT computation. A commonly required bit-reverse function reverses the bits of the coefficient index. However, the bit-reverse permutation can be skipped by using CT butterfly operations for NTT and GS butterfly operations for INTT. FIGS. 1 and 2 illustrate a CT butterfly operator and the GS butterfly operator, respectively. More details regarding NTT/INTT and lattice-based computation of NTT/INTT are provided elsewhere herein.

FIG. 1 illustrates, by way of example, a conceptual circuit diagram of an embodiment of a CT butterfly operator circuit 100. The circuit 100 performs the CT butterfly operations. The circuit 100 takes, as input U 102 and V 104, which are coefficients of respective polynomials, and ω 106, which is a weight. V 104 and ω 106 are modular multiplied (V mod q*ω) using a multiplier 108. A result 118 of the multiplication performed by the multiplier 108 and U 102 are added using an adder 110 to generate a first output coefficient 114. The result 118 and U 102 are subtracted using a subtractor 112 to generate a second output coefficient 116. The first and second output coefficients 114 and 116 can then be used as inputs, U and V, respectively, in a next iteration of circuit 100 operation.

Pseudocode for an iterative NTT operation using the CT butterfly operator circuit 100 is provided:

---
In-Place NTT Algorithm using CT Butterfly Operator Circuit
Require: $a(x) \in R_q$, $\omega_n \in \mathbb{Z}_q$, $n = 2^l$
Ensure: $\hat{a}(x) = NTT(a) \in R_q$
1:   $\hat{a} \leftarrow$ bit – reverse(a)
2:   for i from 1 to l do
3:     $m = 2^{l-i}$
4:     for j from 0 to $2^{i-1}$-1 do
5:       $W \leftarrow \omega_n^{1-j}$
6:       for k from 0 to m-1 do
7:         $U \leftarrow \hat{a}[2jm + k]$
8:         $V \leftarrow \hat{a}[2jm + k + m]$ mod q
9:         $T \leftarrow V \cdot W$
10:        $\hat{a}[2jm + k] = U + T$ mod q
11:        $\hat{a}[2jm + k + m] = U – T$ mod q
12:      end for
13:    end for
14:  end for
15:  return $\hat{a}(x) \in R_q$

--- where a is a polynomial and ω is a twiddle factor, and n is a number of coefficients in the polynomial.

FIG. 2 illustrates, by way of example, a conceptual circuit diagram of an embodiment of a GS butterfly operator circuit 200. The circuit 200 performs the mathematical operations the GS butterfly operation. The circuit 200 takes, as input U 102, V 104, and ω 106. U and V are added mod q, by modular adder 110, resulting in a first output coefficient 220. U 102 and V 104 are subtracted mod q, by modular subtractor 112, resulting in result 224. The result 224 is then multiplied by a weight, ω 106, using a modular multiplier 108. A result of the multiplication performed by the multiplier 108 is a second output coefficient 222. The first and second output coefficients 220 and 222 can then be used as inputs in a next iteration of circuit 200 operation.

What follows is a description of NTT/INTT. Let q be a prime number and $\mathbb{Z}_q$ be the ring of integers modulo q. Define the ring of polynomials for some integer N as $R_q = \mathbb{Z}_q[X]/(X^N+1)$, where the polynomials have n coefficients, each modulo q. Regular font lowercase letters (a) represent single polynomials, bold lowercase letters (a) represent polynomial vectors, and bold uppercase letters (A) to represent a matrix of polynomials. Representations in the NTT domain are represented by (â), (â) and (Â), respectively. Let a and b be polynomial vectors in $R_q$. Let a∘b∈ $R_q$ denote coefficient-wise multiplication of polynomials. The ∘product of a matrix and a vector is the natural extension of coefficient-wise multiplication of the polynomial vectors.

A naive method of polynomial multiplication has $O(n^2)$ complexity. This complexity can be reduced by using NTT. To multiply two polynomials efficiently in lattice-based cryptography, the polynomial rings of the form $R_q = \mathbb{Z}_q[X]/(X^N+1)$ can be used, where $(X^N+1)$ enables fast polynomial division. The NTT transform maps polynomials to the NTT domain at the cost of O(n*log n) where multiplying their coefficients results in a polynomial that corresponds to the product of the original polynomials modulo q and $(X^N+1)$. Coefficient-wise multiplication has a complexity of O(n). A total time complexity is thus O(n·log n).

The NTT is a generalization of a fast Fourier transform (FFT) defined in a finite field. Suppose f is a polynomial of degree n with coefficients in $\mathbb{Z}_q$, as:

$$f = \sum_{i=0}^{n-1} f_i X^i$$

FFT uses the twiddle factor $\omega_n$ n-th root of unity of form $e^{2\pi j/n}$, while NTT has $\omega_n \in \mathbb{Z}_q$ such that $\omega_n$ be a primitive n-th root of unity modulo q, i.e. $\omega_n^n = 1$ mod q. The NTT transforms f, i.e., f̂=NTT(f), is computed as follows for each i∈ {0,1, . . . , n–1}:

$$\hat{f}_i = \sum_{j=0}^{n-1} f_j \omega_n^{ij}$$

The INTT recovers f from f̂ as:

$$f_i = \sum_{j=0}^{n-1} \hat{f}_j \omega_n^{-ij}$$

Hence, the multiplication between two polynomials f and g using NTT can be performed as:

*f·g*=INTT(*NTT*(*f*)∘*NTT*(*g*))

NTT algorithm is shown in pseudocode elsewhere herein.

Figure 3:
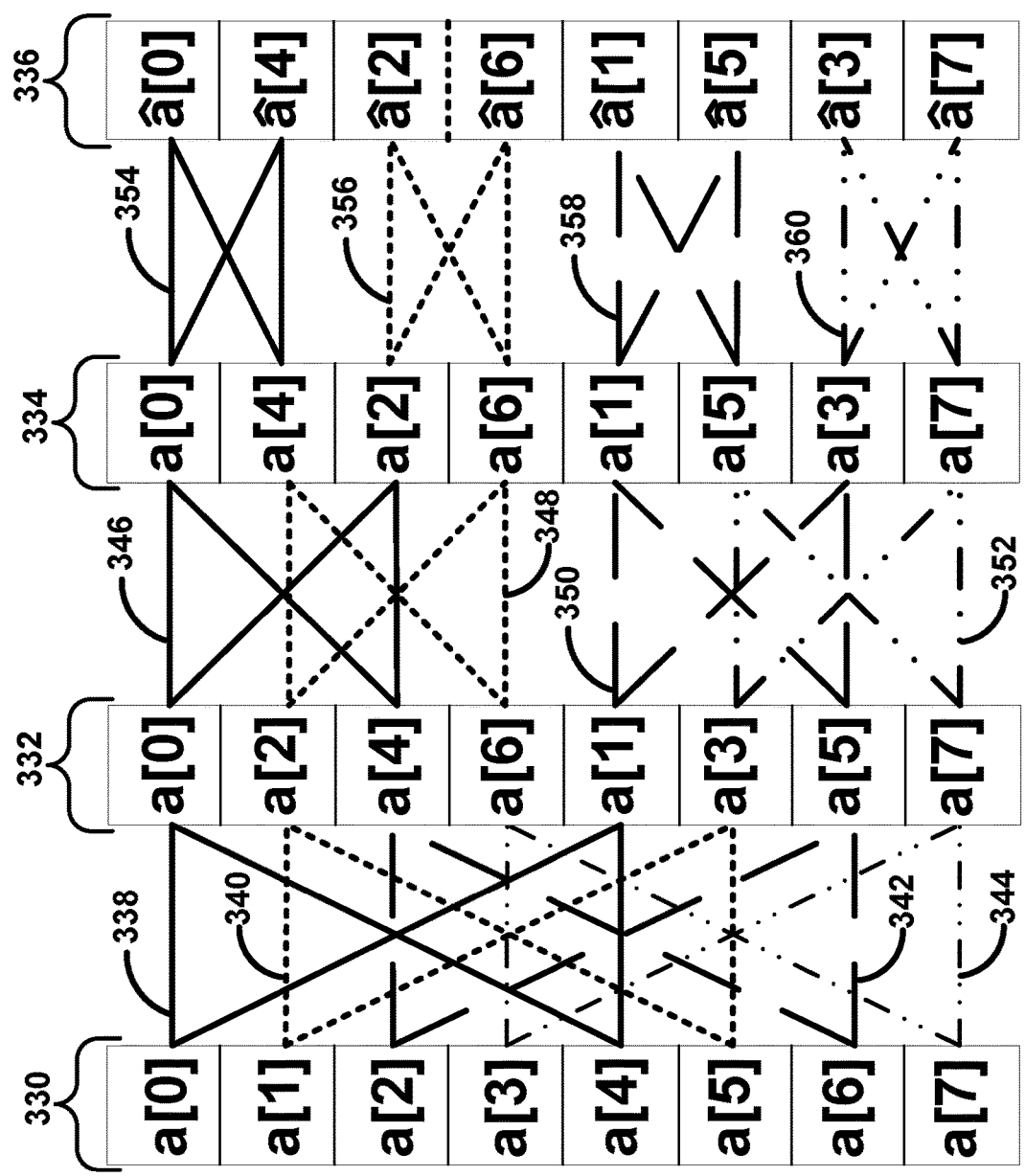
FIG. 3 illustrates, by way of example, a diagram of an embodiment of a data flow for an NTT computation of an 8-coefficient polynomial using CT butterfly operations.

FIG. 3 illustrates, by way of example, a diagram of an embodiment of a data flow for an NTT computation of an 8-coefficient polynomial using CT butterfly operations. At a first stage 330, 8 coefficients are provided, not necessarily all at the same time. The eight coefficients are a[0], a[1], a[2], a[3], a[4], a[5], a[6], a[7]. A few techniques to perform NTT or INTT on the eight coefficients to generate eight converted coefficients â[0], â[1], â[2], â[3], â[4], â[5], â[6], â[7] include:
  (i) using a single butterfly circuit 100 or 200 to perform each of the operations 338, 340, 342, 344, 346, 348, 350, 352, 354, 356, 358, 360 in sequential order and storing the results of each the operations 338, 340, 342, 344, 346, 348, 350, 352, 354, 356, 358, 360 that are needed as they are generated and needed for future calculations;
  (ii) using a single butterfly circuit 100 or 200 in a pipelined fashion to determine â[0] and â[4] by performing operations 338, 342, 346, 348, and 354, then determining â[2] and â[6] by performing operations 340, 344, 348 and 356 and using results from performing operation 346 previously, then determining â[1] and â[5] by using results from performing operations 338 and 342 and the performing operations 350, 352, and 358, then determining â[3] and â[7] by using the results from performing operations 340, 344, 350, and 352 and the performing operation 360;
  (iii) using a parallelized architecture that utilizes n/2 butterfly circuits 100 or 200 situated in parallel to simultaneously perform operations 338, 340, 342, 344 in parallel, then perform operations 346, 348, 350, 352 in parallel, then perform operations 354, 356, 358, 360 in parallel.

The single butterfly circuit 100 or 200 operating in sequence (technique (i)) requires, for a 256 coefficient polynomial 8 rounds of butterfly operations with 128 butterfly operation per round. Each butterfly operation requires three clock cycles per butterfly operation, one cycle to read data, one cycle for the butterfly operator circuit operation, and one cycle to write the data. Converting the 256 coefficient polynomial in these conditions thus requires 3072 clock cycles.

For technique (ii), increasing the depth of butterfly circuits increases an amount of die area overhead due to the data dependency between stages 332, 334, 336. For technique (iii), increasing the number of butterfly circuits increases die area and memory access overhead. The memory access overhead comes from writing all results from the operations 338, 340, 342, 344 before having the ability to perform the operations 346, 348, 350, 352. The memory access latency of the technique (iii) and the die area consumed by the technique (iii) are unnecessarily high.

Figure 4:
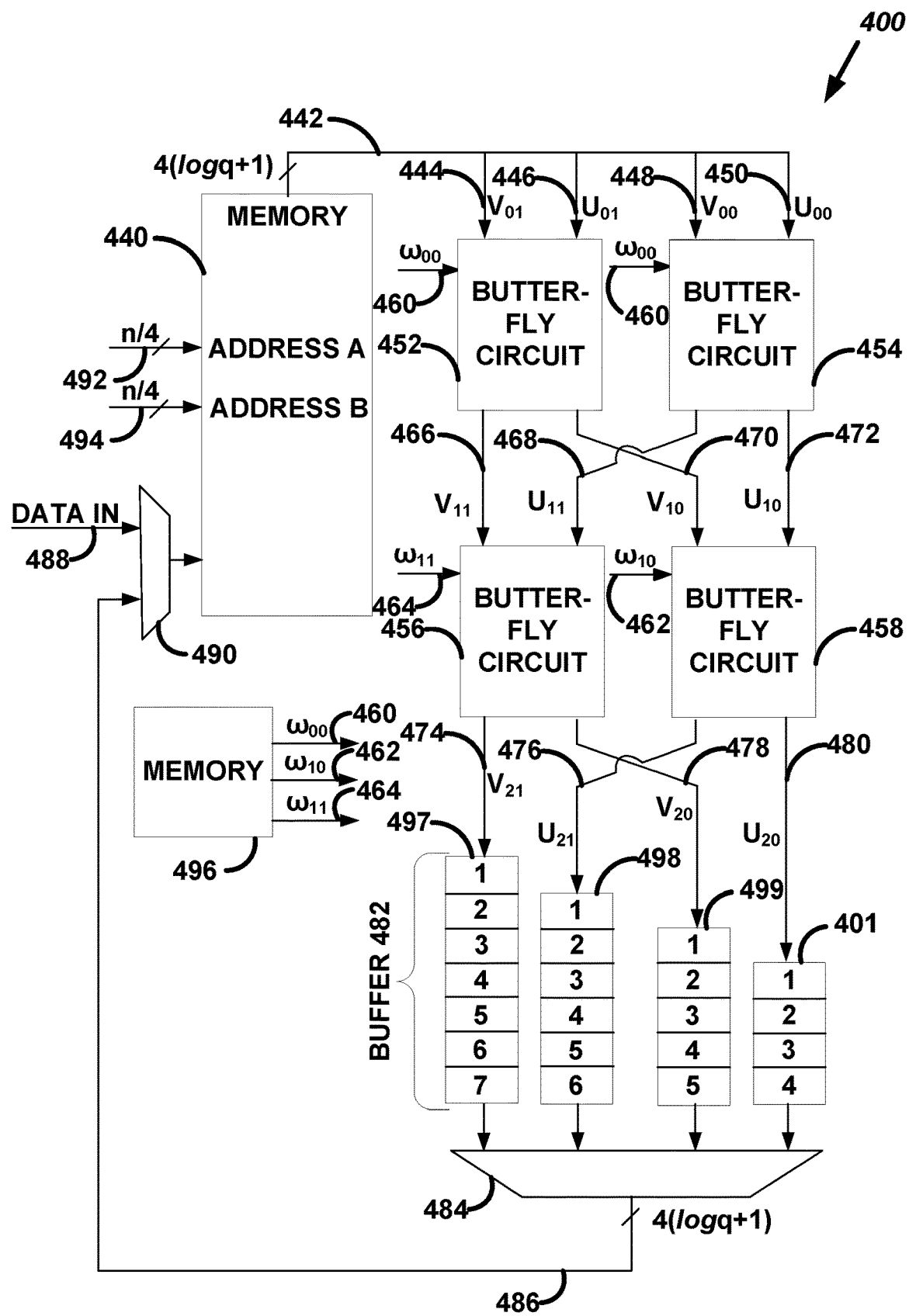
FIG. 4 illustrates, by way of example, a diagram of an embodiment of a circuit that improves time latency in performing NTT/INTT conversions.

FIG. 4 illustrates, by way of example, a diagram of an embodiment of a circuit 400 that improves time latency in performing NTT/INTT conversions. The circuit 400 as illustrated includes a memory 440 that provides coefficients and intermediate NTT/INTT conversion values 444, 446, 448, 450 (jointly coefficient or intermediate results 442) to butterfly circuits 452, 454, 456, 458, respectively. The butterfly circuits 452, 454 provide intermediate results 466, 468, 470, 472 to further butterfly circuits 456, 458. Results 474, 476, 478, 480 are provided to a buffer 482. Multiplexers 484, 490 selects buffer 482 entries or data in 488 (polynomial coefficients) to be written to the memory 440 for NTT/INTT conversion.

The memory 440 can include a random access memory (RAM). The memory 440 allows one to read data 492, which is four polynomial coefficients or intermediate values, in a single clock cycle. The memory 440 allows one to write data 490, which is four NTT/INTT converted coefficients or intermediate values, in a single clock cycle. Each of the memory addresses can store two or four values concatenated. The values 444, 446, 448, 450 can be inputs for one or two butterfly circuits 452, 454. In a single memory read cycle from the memory 440, the butterfly circuit 452 can receive values 444 and 446 as input and the butterfly circuit 454 can receive values 448, 450 as input. In a single memory read cycle from the twiddle factor memory 496, the butterfly circuits 452, 454 can receive a twiddle factor 460. In a single memory read cycle from the twiddle factor memory 496, the butterfly circuits 456, 458 can receive twiddle factors 464, 462, respectively.

The butterfly circuits 452, 454, 456, 458 can be configured as one of the butterfly circuits 100, 200. The butterfly circuits 452 and 454 are electrically situated in parallel. The butterfly circuits 456, 458 are electrically situated in parallel. The butterfly circuit 452 is electrically situated in series with the butterfly circuit 456. The butterfly circuit 452 is electrically situated in series with the butterfly circuit 458. The butterfly circuit 454 is electrically situated in series with the butterfly circuit 456. The butterfly circuit 454 is electrically situated in series with the butterfly circuit 458.

The butterfly circuits 452, 454 operate on the values 444, 446, 448, 450 in one clock cycles to generate values 466, 468, 470, 472. The butterfly circuit 456 receives value 466 from the butterfly circuit 452 and the value 468 from the butterfly circuit 454. The butterfly circuit 458 receives value 470 from the butterfly circuit 452 and the value 472 from the butterfly circuit 454. The butterfly circuit 456 operates on the values 466 and 468, along with twiddle factor 464 to generate values 474, 478. The butterfly circuit 458 operates on the values 470, 472, along with the twiddle factor 462 to generate values 476, 480.

The values 474, 476, 478, and 480 can be stored in a buffer 482 comprised of shift registers 401, 497, 498, 499. Entries can be read from the buffer 482 and written to the memory 440. The entries in the memory 440 can be final results of the NTT/INTT conversion or can intermediate values that can be operated on further by the butterfly circuits 452, 454, 456, 458. The values 474, 476, 478, 480 can be stored in the buffer 482 in an order that is conducive for writing to the memory 440. The order is indicated by Arabic numerals in the buffer 482. At each new output of the butterfly circuits 456, 458 a new value can be stored in each shift register 497, 498, 499, 401 and each value currently stored in the shift register can be shifted to an entry associated with an immediately higher Arabic numeral.

The shift registers 497, 498, 499, 401 can be configured in a serial-in, parallel-out manner. Each of the shift registers 497, 498, 499, 401 can have different depths. The depth is the number of values that can be stored in the shift register 497, 498, 499, 401. The depths of the shift registers 401, 499, 498, 497 can be 4, 5, 6, and 7, respectively. After four output values 480 are received from the butterfly circuit 458, the shift register 401 is full and four values can be read in parallel therefrom. The values from the shift register 401 can then be written to the memory 440 in a single clock cycle. After five output values 478 are received from the butterfly circuit 456, the shift register 499 is full. The four oldest values in the shift register 499 (those occupying entries 2-5) can then be read in parallel therefrom. The values read from the shift register 499 can then be written to the memory 440 in a single clock cycle (after being selected by the multiplexers 484, 490). After six output values 476 are received from the butterfly circuit 458, the shift register 498 is full. The four oldest values in the shift register 498 (those occupying entries 3-6) can then be read in parallel therefrom. The values read from the shift register 498 can then be written to the memory 440 in a single clock cycle (after being selected by the multiplexers 484, 490). After seven output values 474 are received from the butterfly circuit 456, the shift register 497 is full. The four oldest values in the shift register 497 (those occupying entries 4-7) can then be read in parallel therefrom. The values read from the shift register 497 can then be written to the memory 440 in a single clock cycle (after being selected by the multiplexers 484, 490).

The serial-parallel architecture of the circuit 400 ultimately leads to improvements in the performance and efficiency of the NTT/INTT computation. To reduce the memory access overhead, which is the main challenge in an NTT/INTT design, a set of shift registers 401, 499, 498, 497 with SIPO (serial-in, parallel-out) configuration with different depths are used.

Using the circuit 400, four coefficients are fetched from memory and sent to butterfly circuits 452, 454 in each clock cycle. The outputs from the butterfly circuits 456, 458 are stored in four different shift registers 401, 499, 498, 497 that have serial-in, parallel-out mode. The results from the butterfly circuits 456, 458 are written back to memory by reading the different shift registers 401, 499, 498, 497 one by one. The first shift register 401 is full after 4 outputs are received from the butterfly circuit 458, and the 4 coefficients from the shift register 401 can be saved in the memory 440. The shift register 401 is full every four clock cycles after four full operations of the butterfly circuit 458 are completed. The same thing happens after one more clock cycle for the second shift register 499 and so on for the third and fourth shift registers 498 and 497, and their first 4-coefficients are saved to the memory 440.

Each round of NTT/INTT using the circuit 400 involves n/4 (where n is the number of coefficients in the polynomial) read and store operations that are fully pipelined to improve throughput. The pipeline latency between read and write sequences is 2 cycles for reading from memory, 8 cycles for two stages of butterfly operations, and 4 cycles for buffering the results in registers for the first write operation.

The multiplexer 484 can provide all four values from one of the shift registers 401, 499, 498, 497, concatenated together to the memory 440. The multiplexer 490 can provide either raw coefficient data as data in 488 to the memory 440 or can provide the values 486 from the multiplexer 484 to the memory 440.

The twiddle factor memory 496 is a read only memory (ROM) that stores the twiddle factors 460, 462, 464 relevant for operation of the butterfly circuits 452, 454, 456, 458.

For a complete NTT operation with 8 stages, which is what is used for a 256-coefficient polynomial (e.g., n=256), the circuit takes $$\frac{8}{2} = 4$$

rounds. Each round involves $$\frac{256}{4} = 64$$

operations in the circuit 400. Hence, the latency of each round is equal to 64+2+8+4=78 cycles. The total latency for each round of NTT/INTT would be 4×78=312 clock cycles. This is nearly a thousand fold reduction from the sequential technique discussed previously. Considering an operation frequency of 500 MHz for the circuit 400, the throughput would be 1,602 k operations/second.

The circuit 400 provides a pure hardware NTT/INTT architecture that offers higher computation speed and flexibility than prior NTT/INTT circuits. The circuit 400 enables one to design a merged-layer hardware architecture of NTT/INTT operation that can be optimized and mapped to a field programmable gate array (FPGA) or application specific integrated circuit (ASIC) platform to develop a high-performance post-quantum cryptography (PQC) architecture.

In operating the circuit 400, the inputs to the butterfly circuits 452, 454 can be chosen such that after each of the butterfly circuits 456, 458 provides a first output the intermediate values required to determine a[0] in the stage 336 are known. This means that a[0] and a[4] from stage 330 are provided as input to the butterfly circuit 452 and that a[2] and a[6] are provided to the butterfly circuit 454. Then, after a second output is received from the butterfly circuits 456, 458 the intermediate values required to determine a[2] at the stage 336 are known by reverse engineering the inputs required. And so on. Thus, the inputs are reverse engineered so that data latency is reduced as compared to other solutions discussed elsewhere. The circuit 400 operating in this way may be referred to as a "hybrid pipelined-serial-parallel" architecture.

Figure 5:
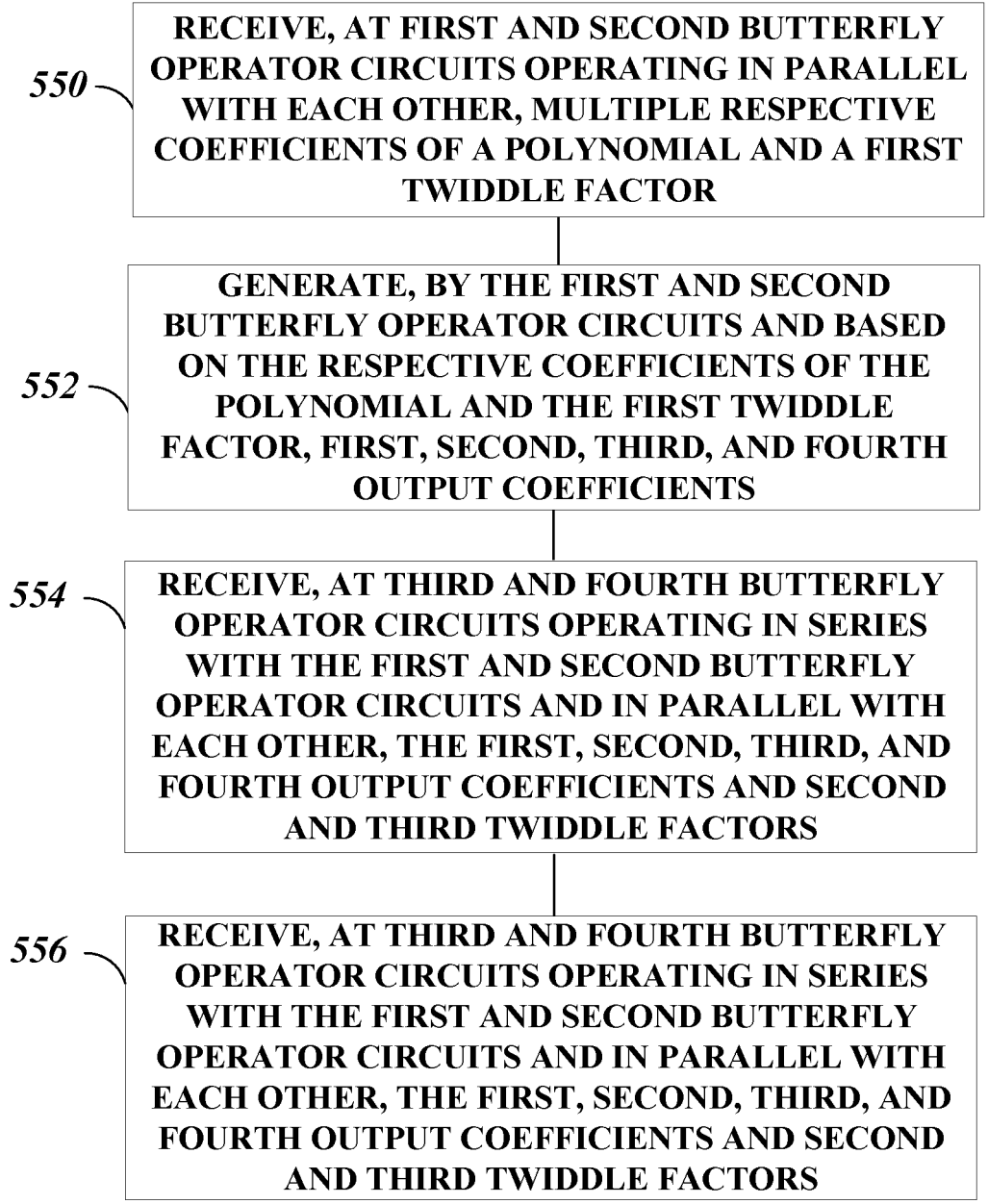
FIG. 5 illustrates, by way of example, a block diagram of an embodiment of a method for NTT/INTT.

FIG. 5 illustrates, by way of example, a block diagram of an embodiment of a method 500 for improved NTT/INTT. The method 500 as illustrated includes receiving, at first and second butterfly operator circuits operating in parallel with each other, multiple respective coefficients of a polynomial and a first twiddle factor, at operation 550; generating, by the first and second butterfly operator circuits and based on the respective coefficients of the polynomial and the first twiddle factor, first, second, third, and fourth output coefficients, at operation 552; receiving, at third and fourth butterfly operator circuits operating in series with the first and second butterfly operator circuits and in parallel with each other, the first, second, third, and fourth output coefficients and second and third twiddle factors, at operation 554; and generating, by the third and fourth butterfly operator circuits and based on the first, second, third, and fourth output coefficients, fifth, sixth, seventh, and eighth output coefficients, at operation 556.

The first, second, third, and fourth butterfly operator circuits can be configured as Cooley-Tukey (CT) butterfly operator circuits or Gentleman-Sande (GS) butterfly operator circuits. The method 500 can further include receiving at respective shift registers each of the fifth, sixth, seventh, eighth output coefficients, respectively. The respective shift registers can include first, second, third, and fourth shift registers. The first shift register can receive the fifth output coefficient at each clock cycle. The second shift register can receive the sixth output coefficient at each clock cycle. The third shift register can receive the seventh output coefficient at each clock cycle. The fourth shift register can receive the eighth output coefficient at each clock cycle. Each of the respective shift registers can have a different depth. The depth of the respective shift registers can be four, five, six, and seven, respectively.

The method 500 can further include providing, by a first multiplexer and based on a select control of the first multiplexer, contents of the respective shift registers in consecutive, respective clock cycles. The contents of the respective shift registers can be provided to a second multiplexer in the consecutive, respective clock cycles. The first output coefficient can be provided from the first butterfly operator circuit to the third butterfly operator circuit. The second output coefficient can be provided from the first butterfly operator circuit to the fourth butterfly operator circuit. The third output coefficient can be provided from the second butterfly operator circuit to the third butterfly operator circuit. The fourth output coefficient can be provided from the second butterfly operator circuit to the fourth butterfly operator circuit.

Figure 6:
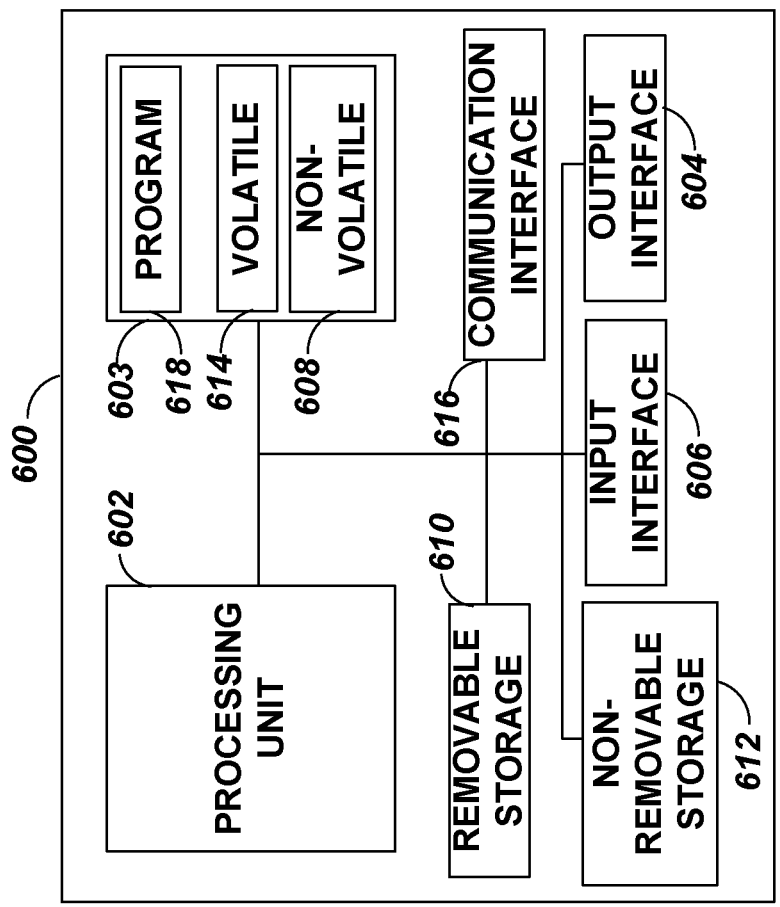
FIG. 6 illustrates, by way of example, a block diagram of an embodiment of a machine (e.g., a computer system) to implement one or more embodiments.

FIG. 6 illustrates, by way of example, a block diagram of an embodiment of a machine 600 (e.g., a computer system) to implement one or more embodiments. The machine 600 can implement a technique for NTT/INTT. Any of the CT butterfly operator circuit 100, GS butterfly operator circuit 200, butterfly operator circuit 452, 454, 456, 458, stage 330, 332, 334, 336, memory 440, 496, multiplexer 484, 490, shift register 401, 497, 498, 499, method 500 or a component or operation thereof can include one or more of the components of the machine 600. One or more of the CT butterfly operator circuit 100, GS butterfly operator circuit 200, butterfly operator circuit 452, 454, 456, 458, stage 330, 332, 334, 336, memory 440, 496, multiplexer 484, 490, shift register 401, 497, 498, 499, method 500, or a component or operations thereof can be implemented, at least in part, using a component of the machine 600. One example machine 600 (in the form of a computer), may include a processing unit 602, memory 603, removable storage 610, and non-removable storage 612. Although the example computing device is illustrated and described as machine 600, the computing device may be in different forms in different embodiments. For example, the computing device may instead be a smartphone, a tablet, smartwatch, or other computing device including the same or similar elements as illustrated and described regarding FIG. 6. Devices such as smartphones, tablets, and smartwatches are generally collectively referred to as mobile devices. Further, although the various data storage elements are illustrated as part of the machine 600, the storage may also or alternatively include cloud-based storage accessible via a network, such as the Internet.

Memory 603 may include volatile memory 614 and non-volatile memory 608. The machine 600 may include— or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 600 may include or have access to a computing environment that includes input 606, output 604, and a communication connection 616. Output 604 may include a display device, such as a touchscreen, that also may serve as an input device. The input 606 may include one or more of a touchscreen, touchpad, mouse, keyboard, camera, one or more device-specific buttons, one or more sensors integrated within or coupled via wired or wireless data connections to the machine 600, and other input devices. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 602 (sometimes called processing circuitry) of the machine 600. A hard drive, CD-ROM, and RAM are some examples of articles including a non-transitory computer-readable medium such as a storage device. For example, a computer program 618 may be used to cause processing unit 602 to perform one or more methods or algorithms described herein.

The operations, functions, or algorithms described herein may be implemented in software in some embodiments. The software may include computer executable instructions stored on computer or other machine-readable media or storage device, such as one or more non-transitory memories (e.g., a non-transitory machine-readable medium) or other type of hardware based storage devices, either local or networked. Further, such functions may correspond to subsystems, which may be software, hardware, firmware, or a combination thereof. Multiple functions may be performed in one or more subsystems as desired, and the embodiments described are merely examples. The software may be executed on a digital signal processor, ASIC, microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, field programmable gate arrays (FPGAs), or the like).

Additional Notes and Examples

Example 1 includes a method comprising a circuit for number theoretic transform (NTT) or inverse NTT (INTT) comprising a first butterfly operator circuit configured to generate first and second output coefficients based on first and second coefficients of a polynomial and a twiddle factor, a second butterfly operator circuit (i) situated to operate in parallel with the first butterfly operator circuit and (ii) configured to generate third and fourth output coefficients based on third and fourth coefficients of the polynomial and the twiddle factor, a third butterfly operator circuit (i) situated to operate in series with the first butterfly operator circuit and the second butterfly operator circuit and (ii) configured to generate fifth and sixth output coefficients based on the first and third output coefficients and a second twiddle factor, and a fourth butterfly operator circuit (i) situated to operate in series with the first butterfly operator circuit and the second butterfly operator circuit and parallel with the third butterfly operator circuit and (ii) configured to generate seventh and eighth output coefficients based on the second and fourth output coefficients and a third twiddle factor.

In Example 2, Example 1 further includes, wherein the first, second, third, and fourth butterfly operator circuits are configured as Cooley-Tukey (CT) butterfly operator circuits or Gentleman-Sande (GS) butterfly operator circuits.

In Example 3, at least one of Examples 1-2 further includes first, second, third, and fourth shift registers situated to receive fifth, sixth, seventh, eighth output coefficients, respectively.

In Example 4, Example 3 further includes, wherein the first shift register is situated to receive the fifth output coefficient at each clock cycle, the second shift register is situated to receive the sixth output coefficient at each clock cycle, the third shift register is situated to receive the seventh output coefficient at each clock cycle, and the fourth shift register is situated to receive the eighth output coefficient at each clock cycle.

In Example 5, Example 4 further includes, wherein each of the first, second, third, and fourth shift registers has a different depth.

In Example 6, Example 5 further includes, wherein the depth of the first, second, third, and fourth shift registers is four, five, six, and seven, respectively.

In Example 7, at least one of Examples 406 further includes a first multiplexer configured to provide, based on a select control of the first multiplexer, contents of the first, second, third, and fourth shift registers in consecutive, respective clock cycles.

In Example 8, Example 7 further includes a second multiplexer, and wherein the first multiplexer is configured to provide contents of the first, second, third, and fourth shift registers to the second multiplexer in the consecutive, respective clock cycles.

Example 9 includes a method for number theoretic transform (NTT) or inverse NTT (INTT) comprising receiving, at first and second butterfly operator circuits operating in parallel with each other, multiple respective coefficients of a polynomial and a first twiddle factor, generating, by the first and second butterfly operator circuits and based on the respective coefficients of the polynomial and the first twiddle factor, first, second, third, and fourth output coefficients, receiving, at third and fourth butterfly operator circuits operating in series with the first and second butterfly operator circuits and in parallel with each other, the first, second, third, and fourth output coefficients and second and third twiddle factors, and generating, by the third and fourth butterfly operator circuits and based on the first, second, third, and fourth output coefficients, fifth, sixth, seventh, and eighth output coefficients.

In Example 10, Example 9 further includes, wherein the first, second, third, and fourth butterfly operator circuits are configured as Cooley-Tukey (CT) butterfly operator circuits or Gentleman-Sande (GS) butterfly operator circuits.

In Example 11, at least one of Examples 9-10 further includes receiving at respective shift registers each of the fifth, sixth, seventh, eighth output coefficients, respectively.

In Example 12, Example 11 further includes, wherein the respective shift registers include first, second, third, and fourth shift registers, the first shift register receives the fifth output coefficient at each clock cycle, the second shift register receives the sixth output coefficient at each clock cycle, the third shift register receives the seventh output coefficient at each clock cycle, and the fourth shift register receives the eighth output coefficient at each clock cycle.

In Example 13, at least one of Examples 11-12 further includes, wherein each of the respective shift registers has a different depth.

In Example 14, Example 13 further includes, wherein the depth of the respective shift registers is four, five, six, and seven, respectively.

In Example 15, at least one of the Examples 11-14 further includes providing, by a first multiplexer and based on a select control of the first multiplexer, contents of the respective shift registers in consecutive, respective clock cycles.

In Example 16, Example 15 further includes, wherein the contents of the respective shift registers are provided to a second multiplexer in the consecutive, respective clock cycles.

In Example 17, at least one of Examples 9-16 further includes, wherein the first output coefficient is provided from the first butterfly operator circuit to the third butterfly operator circuit, the second output coefficient is provided from the first butterfly operator circuit to the fourth butterfly operator circuit, the third output coefficient is provided from the second butterfly operator circuit to the third butterfly operator circuit, and the fourth output coefficient is provided from the second butterfly operator circuit to the fourth butterfly operator circuit.

Example 18 includes a system comprising first and second butterfly operator circuits situated to operate in parallel with each other, the first and second butterfly operator circuit jointly configured to generate first, second, third, and fourth output coefficients based on first, second, third, and fourth coefficients of a polynomial and a twiddle factor, third and fourth butterfly operator circuits situated to operate in parallel with each other and in series with the first and second butterfly operator circuits, the third and fourth butterfly operator circuits jointly configured to generate fifth, sixth, seventh, and eighth output coefficients based on first, second, third, and fourth output coefficients and second and third twiddle factors, and first, second, third, and fourth shift registers situated to jointly receive the fifth, sixth, seventh, eighth output coefficients.

In Example 19, Example 18 further includes, wherein the first shift register is situated to receive the fifth output coefficient at each clock cycle, the second shift register is situated to receive the sixth output coefficient at each clock cycle, the third shift register is situated to receive the seventh output coefficient at each clock cycle, and the fourth shift register is situated to receive the eighth output coefficient at each clock cycle.

In Example 20, Example 19 further includes, wherein each of the first, second, third, and fourth shift registers has a different depth.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A circuit for number theoretic transform (NTT) or inverse NTT (INTT) comprising:
a first butterfly operator circuit configured to generate first and second output coefficients based on first and second coefficients of a polynomial and a twiddle factor;
a second butterfly operator circuit (i) situated to operate in parallel with the first butterfly operator circuit and (ii) configured to generate third and fourth output coefficients based on third and fourth coefficients of the polynomial and the twiddle factor;
a third butterfly operator circuit (i) situated to operate in series with the first butterfly operator circuit and the second butterfly operator circuit and (ii) configured to generate fifth and sixth output coefficients based on the first and third output coefficients and a second twiddle factor; and
a fourth butterfly operator circuit (i) situated to operate in series with the first butterfly operator circuit and the second butterfly operator circuit and parallel with the third butterfly operator circuit and (ii) configured to generate seventh and eighth output coefficients based on the second and fourth output coefficients and a third twiddle factor.

2. The circuit of claim 1, wherein the first, second, third, and fourth butterfly operator circuits are configured as Cooley-Tukey (CT) butterfly operator circuits or Gentleman-Sande (GS) butterfly operator circuits.

3. The circuit of claim 1, further comprising:
first, second, third, and fourth shift registers situated to receive fifth, sixth, seventh, eighth output coefficients, respectively.

4. The circuit of claim 3, wherein:
the first shift register is situated to receive the fifth output coefficient at each clock cycle;
the second shift register is situated to receive the sixth output coefficient at each clock cycle;
the third shift register is situated to receive the seventh output coefficient at each clock cycle; and
the fourth shift register is situated to receive the eighth output coefficient at each clock cycle.

5. The circuit of claim 4, wherein each of the first, second, third, and fourth shift registers has a different depth.

6. The circuit of claim 5, wherein the depth of the first, second, third, and fourth shift registers is four, five, six, and seven, respectively.

7. The circuit of claim 4, further comprising:
first multiplexer configured to provide, based on a select control of the first multiplexer, contents of the first, second, third, and fourth shift registers in consecutive, respective clock cycles.

8. The circuit of claim 7, further comprising:
a second multiplexer; and
wherein the first multiplexer is configured to provide contents of the first, second, third, and fourth shift registers to the second multiplexer in the consecutive, respective clock cycles.

9. A method for number theoretic transform (NTT) or inverse NTT (INTT) comprising:
receiving, at first and second butterfly operator circuits operating in parallel with each other, multiple respective coefficients of a polynomial and a first twiddle factor;
generating, by the first and second butterfly operator circuits and based on the respective coefficients of the polynomial and the first twiddle factor, first, second, third, and fourth output coefficients;
receiving, at third and fourth butterfly operator circuits operating in series with the first and second butterfly operator circuits and in parallel with each other, the first, second, third, and fourth output coefficients and second and third twiddle factors; and
generating, by the third and fourth butterfly operator circuits and based on the first, second, third, and fourth output coefficients, fifth, sixth, seventh, and eighth output coefficients.

10. The method of claim 9, wherein the first, second, third, and fourth butterfly operator circuits are configured as Cooley-Tukey (CT) butterfly operator circuits or Gentleman-Sande (GS) butterfly operator circuits.

11. The method of claim 9, further comprising receiving at respective shift registers each of the fifth, sixth, seventh, eighth output coefficients, respectively.

12. The method of claim 11, wherein:
the respective shift registers include first, second, third, and fourth shift registers;
the first shift register receives the fifth output coefficient at each clock cycle;
the second shift register receives the sixth output coefficient at each clock cycle;
the third shift register receives the seventh output coefficient at each clock cycle; and
the fourth shift register receives the eighth output coefficient at each clock cycle.

13. The method of claim 11, wherein each of the respective shift registers has a different depth.

14. The method of claim 13, wherein the depth of the respective shift registers is four, five, six, and seven, respectively.

15. The method of claim 11, further comprising:
providing, by a first multiplexer and based on a select control of the first multiplexer, contents of the respective shift registers in consecutive, respective clock cycles.

16. The method of claim 15, wherein the contents of the respective shift registers are provided to a second multiplexer in the consecutive, respective clock cycles.

17. The method of claim 9, wherein:
the first output coefficient is provided from the first butterfly operator circuit to the third butterfly operator circuit;
the second output coefficient is provided from the first butterfly operator circuit to the fourth butterfly operator circuit;
the third output coefficient is provided from the second butterfly operator circuit to the third butterfly operator circuit; and
the fourth output coefficient is provided from the second butterfly operator circuit to the fourth butterfly operator circuit.

18. A system comprising:
first and second butterfly operator circuits situated to operate in parallel with each other, the first and second butterfly operator circuits jointly configured to generate first, second, third, and fourth output coefficients based on first, second, third, and fourth coefficients of a polynomial and a twiddle factor;

third and fourth butterfly operator circuits situated to operate in parallel with each other and in series with the first and second butterfly operator circuits, the third and fourth butterfly operator circuits jointly configured to generate fifth, sixth, seventh, and eighth output coefficients based on first, second, third, and fourth output coefficients and second and third twiddle factors; and first, second, third, and fourth shift registers situated to jointly receive the fifth, sixth, seventh, eighth output coefficients.

19. The system of claim 18, wherein:

the first shift register is situated to receive the fifth output coefficient at each clock cycle;

the second shift register is situated to receive the sixth output coefficient at each clock cycle;

the third shift register is situated to receive the seventh output coefficient at each clock cycle; and the fourth shift register is situated to receive the eighth output coefficient at each clock cycle.

20. The system of claim 19, wherein each of the first, second, third, and fourth shift registers has a different depth.

* * * * *